(12) United States Patent
Fellman

(10) Patent No.: US 7,305,394 B2
(45) Date of Patent: Dec. 4, 2007

(54) INTERNET DOMAIN NAME REGISTRATION SYSTEM

(76) Inventor: Barry Fellman, 2539 S. Bayshore Dr., Miami, FL (US) 33133

( * ) Notice: Subject to any disclaimer, the term of this patent is extended or adjusted under 35 U.S.C. 154(b) by 363 days.

(21) Appl. No.: 11/090,907

(22) Filed: Mar. 25, 2005

(65) Prior Publication Data

US 2005/0256853 A1  Nov. 17, 2005

Related U.S. Application Data

(63) Continuation of application No. 09/725,667, filed on Nov. 29, 2000, now Pat. No. 6,980,990.

(60) Provisional application No. 60/168,368, filed on Dec. 1, 1999.

(51) Int. Cl.
G06F 17/30 (2006.01)
G06F 17/00 (2006.01)

(52) U.S. Cl. ........................ 707/9; 707/100; 709/217; 709/219

(58) Field of Classification Search ...................... None
See application file for complete search history.

(56) References Cited

U.S. PATENT DOCUMENTS

| | | | |
|---|---|---|---|
| 5,404,506 A | 4/1995 | Fujisawa et al. | |
| 5,488,725 A | 1/1996 | Turtle et al. | |
| 5,758,149 A | 5/1998 | Bierma et al. | |
| 5,852,657 A | 12/1998 | Malik et al. | |
| 5,864,845 A | 1/1999 | Voorhees et al. | |
| 5,943,666 A | 8/1999 | Kleewein et al. | |
| 6,006,225 A | 12/1999 | Bowman et al. | |
| 6,012,067 A | 1/2000 | Sarker | |
| 6,029,195 A | 2/2000 | Herz | |
| 6,055,538 A | 4/2000 | Kessenich et al. | |
| 6,094,647 A | 7/2000 | Kato et al. | |
| 6,298,341 B1 * | 10/2001 | Mann et al. | 707/3 |
| 6,338,082 B1 | 1/2002 | Schneider | |
| 6,412,014 B1 | 6/2002 | Ryan | |
| 6,519,589 B2 | 2/2003 | Mann et al. | |
| 6,539,370 B1 | 3/2003 | Chang et al. | |
| 6,560,634 B1 | 5/2003 | Broadhurst | |
| 6,980,990 B2 * | 12/2005 | Fellman | 707/10 |
| 7,069,228 B1 * | 6/2006 | Rose et al. | 705/5 |
| 2002/0129013 A1 * | 9/2002 | Thomas | 707/3 |

* cited by examiner

*Primary Examiner*—Jeffrey Gaffin
*Assistant Examiner*—Tony Mahmoudi
(74) *Attorney, Agent, or Firm*—Knobbe, Martens, Olson & Bear, LLP

(57) ABSTRACT

A domain name registration system includes a user interface through which a user can submit multiple names to a query server to determine the availability of the names for domain name registration. After the query results are returned for each of the multiple names submitted, the user is presented with a table listing the availability of each name in combination with multiple Top-Level Domain (TLD) extensions. The user is able to select one or more names from the table for registration in the registry database. After the query server has attempted to register each of the selected names, the user is presented with a Registry Response Table indicating which of the selected names were successfully registered as domain names. Thus, the system and method increases the speed and productivity of querying and updating a domain name registry or other database.

19 Claims, 10 Drawing Sheets

Signature Domains
The Web Address Experts

*THE LEADER IN*
.com    .net    .org
DOMAIN NAME REGISTRATION

- Quick – Check up to 5 names at a time.
- Easy – Our simple instructions guide you.
- Save – Only $55 each for 5 or more names.

Start here by entering the names that you would like to register.
Enter up to 5 names and click "Check Availability"

www. Petes Grill
www. Petes Diner
www. Petes Place
www. Petes Cafe
www. Petes Restaurant Check Availability ICANN Accredited
Registry Certified
REGISTER My Domain
MY DOMAINS Management Tools
WHOIS Registrant Information
Pricing and Services
Corporate Accounts
Transfer Registrar
Domain Name Rules
Contact Us
Registration Agreement
Dispute Policy

Signature Domains
The Web Address Experts

The Leader in Domain Name Registration

.com  .net  .org

| | | |
|---|---|---|
| FREE PARKING | EASY | SAVE |
| QUICK | Step by step guide | $25.00/yr 5 or more |
| Check 5 at a time | | REAL TIME RESPONSE |

Enter one name per line and click 'Check Availability'

Enter or paste one name per line.
You may check up to 50 domain names at a time.

420

```
Petes Diner
Petes Grill
Petes Place
Petes Restaurant
Petes Cafe
Petes-Diner
Petes-Grill
Pete-Place
Petes-Restaurant
Petes-Cafe
reachforthestars
reachingforthestars
```

Check Availability

Gift of Name
Perfect for BIRTHDAYS | GIVE AN OFFICIAL INTERNET DOMAIN NAME
www.MattLauer.com [Check]

- ICANN Accredited
- ALL FEES INCLUDED
- REGISTER My Domain
- MY DOMAINS
- WHOIS
- LOGIN
- Pricing and Services
- Frequently Asked Questions
- Affiliate Program
- Corporate Accounts
- URL Forwarding
- Change Register to Signature Domains
- Change Registrant (Sell A Domain)
- Contact Us

Signature Domains
*The Web Address Experts* — 610

Select the names you want to register by checking the boxes. Each name you check will be added to your selection list — 620

| Domain | .com | .net | .org |
|---|---|---|---|
| yahoo | Not Available | Not Available | Not Available |
| patlaw | Not Available | Not Available | ☐ Available |
| specifiedname | ☐ Available | ☐ Available | ☐ Available |
| namevariation1 | ☐ Available | ☐ Available | ☐ Available |
| namevariation2 | ☐ Available | ☐ Available | ☐ Available — 630 |

[Register Selected Names] [Show Selection List]

---

ICANN Accredited
Registry Certified

REGISTER
My Domain

MY DOMAINS
Management Tools

WHOIS
Registrant Information

Pricing and Services

Corporate Accounts

Transfer Registrar

Domain Name Rules

Contact Us

Registration Agreement

Dispute Policy

FIG. 7

MULTI-CHECK SYSTEM AVAILABILITY RESULTS TABLE FOR BATCH MODE IMPLEMENTATION

620A

| DOMAIN NAME | .com | .net | .org |
|---|---|---|---|
| askalbert | X | X | Available |
| askdad | X | X | X |
| askfreud | X | Available | Available |
| askgenius | Available | Available | Available |
| askmore | X | X | Available |
| classicbeauty | X | X | X |
| conclusiveresults | X | X | Available |
| dancingintherain | X | X | Available |
| datadomains | X | Available | Available |
| dealbreaker | Available | X | Available |
| diffuse | X | Available | X |
| emotionalstates | Available | Available | Available |
| escrowexpert | X | Available | Available |
| escrowhold | Available | X | Available |
| escrowrep | X | Available | Available |
| escrowspecialist | X | Available | Available |
| eugenesmith | Available | Available | Available |
| fineartphoto | X | X | Available |
| frivolousgames | X | X | Available |
| frontrowseat | X | X | Available |
| getcooking | X | X | Available |
| getonwithit | X | X | Available |
| havemore | X | Available | Available |
| hitandmiss | X | X | Available |
| myluckyday | X | Available | Available |
| mynetchannels | X | X | Available |
| netfrontend | X | X | X |
| number0 | X | Available | Available |
| oxymorons | X | X | X |
| perfectmarriage | X | X | Available |
| personalshoppers | X | X | X |
| photosales | X | Available | Available |

X = not available

Signature Domains
The Web Address Experts

ICANN
Accredited

Registry
Certified

REGISTER
My Domain

MY DOMAINS
Management Tools

WHOIS
Registrant Information

Pricing and Services

Corporate Accounts

Transfer Registrar

Domain Name Rules

Contact Us

Registration Agreement

Dispute Policy

Select the names you want to register by checking the boxes. Each name you check will be added to your selection list

| Domain | .com | .net | .org |
|---|---|---|---|
| yahoo | Not Available | Not Available | Not Available |
| patlaw | Not Available | Not Available | ☐ Available |
| specifiedname | ☑ Available | ☑ Available | ☑ Available |
| namevariation1 | ☑ Available | ☐ Available | ☐ Available |
| namevariation2 | ☑ Available | ☐ Available | ☐ Available |

620

630

[Register Selected Names] [Show Selection List]

FIG. 8

Signature Domains
The Web Address Experts

You have selected the following names for registration. If you are satisfied with your selections, begin the registration process. You may delete names from your list by unchecking the names and clicking "Update List"

Domain Name List

- ☑ specifiedname.com
- ☑ specifiedname.net
- ☑ specifiedname.org
- ☑ namevariation1.com
- ☑ namevariation2.com

[Begin Registration] [Update List]

You may also check for additional names.

[Check Availability]

---

ICANN Accredited
Registry Certified

REGISTER
My Domain

MY DOMAINS
Management Tools

WHOIS
Registrant Information

Pricing and Services

Corporate Accounts

Transfer Registrar

Domain Name Rules

Contact Us

Registration Agreement

Dispute Policy

FIG. 9

Signature Domains
The Web Address Experts

ICANN Accredited
Registry Certified

REGISTER
My Domain

MY DOMAINS
Management Tools

WHOIS
Registrant Information

LOGOUT

Pricing and Services

Corporate Accounts

Transfer Registrar

Frequently Asked Questions

Contact Us

Registration Agreement

Dispute Policy

Thank you for choosing Signature Domains as you registar.

The following names have been submitted to the Registry. The response received from the registry is shown next to each domain user.

| Domain Name | Registry Response | |
|---|---|---|
| | Status | Expiration Date |
| specifiedname.com | active | 2001-11-29 |
| specifiedname.net | active | 2001-11-29 |
| specifiedname.org | active | 2001-11-29 |
| namevariation1.com | active | 2001-11-29 |
| namevariation2.com | active | 2001-11-29 |

— 1020

Your credit card has been charged $275.00

Name: Bob Smith
Credit Card Number: xxxxxxxxxxxx5454
Expiration Date: 2/2003

FIG. 10

INTERNET DOMAIN NAME REGISTRATION SYSTEM

CROSS-REFERENCE TO RELATED APPLICATION

This application is a continuation of U.S. application Ser. No. 09/725,667, filed Nov. 29, 2000 now U.S. Pat. No. 6,980,990, which claims the benefit of U.S. provisional application No. 60/168,368, filed Dec. 1, 1999.

BACKGROUND OF THE INVENTION

1. Field of the Invention

The present invention relates to information searching, retrieval, and modification in database systems, and more specifically, relates to a method for processing and displaying queries in a domain name registration system.

2. Description of the Related Art

The Domain Name System (DNS) originated with the implementation of ARPAnet (a project of the Defense Advanced Research Projects Agency). It enabled individual computers to be identified uniquely for the purpose of transmitting and receiving data over a wide area network. The DNS contains information that allows each computer to be uniquely identified. Each computer on the network was assigned an address, which today is known as an Internet Protocol Address (IP Address). Today, each computer's IP Address consists of a unique string of digits. A domain name consists of a unique string of characters. The DNS maps each unique domain name to its unique IP Address. Domain names consist of two parts: an initial string of alphameric characters followed by a period (commonly known as "dot") and by a second string of alphameric characters. The second string of characters is known as a Top Level Domain (TLD). The DNS recognizes only TLDs that have been specified by international convention. Some of the most commonly used TLDs are "com," "net," and "org." The first string of characters followed by the dot and then followed by the TLD is known as a Second Level Domain (SLD).

The system of computers and databases that directs the mapping of each unique domain name to its unique IP address is the DNS. The primary database for the DNS is the "A Root Zone File". This database is at the top of the DNS tree and is the authoritative database throughout the Internet. The "A Root Zone File" has been maintained under quasi-governmental control with input from government agencies and academia and is currently directed by the U.S. Department of Commerce. Other elements of the DNS are "name servers" which are computers and associated databases distributed throughout the Internet containing information that map domain names to specific IP Addresses.

The registry database is the Authoritative database for all .com, net, org, and .edu TLDs. The registry database contains all domain names that have been registered in those TLDs and information about each domain name's creation and expiration date, its name servers and the name servers' IP Addresses. The registry database is operated under government contract with the U.S. Department of Commerce. Entities that have received accreditation from Internet Corporation for Assigned Names and Numbers (ICANN), have received technical certification from the registry database, and have complied with other requirements are qualified to become "Registrars." Registrars have the ability to add, modify and delete data elements including domain names from the registry database.

The availability of a data element in the registry database is determined by specifying a single domain name or a single string of characters that comprise the SLD and submitting a query using that string of characters. This procedure is used by registrars to query the registry database as well as to insert names to the registry database. As the number of registered domain names has increased, the amount of time required to find a suitable domain name that is available by querying the registry database has increased. Many names with obvious application to commercial endeavors have already been registered. It is increasingly difficult to find suitable domain names for commercial and other endeavors. One problem with prior domain name registration systems is that users can not easily check multiple names at one time. The process of checking a single name, finding out whether it is available, checking another variation and finding out whether that name is available, checking yet other variations for availability, and making a list of the available choices is often lengthy, laborious and frustrating.

Another problem with domain name registration is that as more domain names are registered, it is increasingly difficult to create the ideal domain name suitable for a particular purpose or commercial venture. Users often spend much time trying variations of word orders or finding synonyms for a particular word.

SUMMARY

The present invention addresses the foregoing problems by providing a system and method for facilitating the querying of domain names in the registry database and the addition and modification of data elements to the registry database in a novel manner. The system includes a computer server for generating and displaying real-time data tables and a query server for checking the availability of and inserting multiple names as domain names in the registry database. In one embodiment, the computer server functions as a web server to provide an easy-to-use interface between the system and a system user.

The multiple checking and registration method is invoked when a user submits multiple names to determine the availability of the names for registration as domain names in the registry database. The names may, but need not, include TLD extensions (as discussed below). The user specifies the names using a display screen or view, which may be a web page or another screen or view produced by proprietary software. In another embodiment, the names may be specified using voice recognition software. By allowing the user to submit multiple domain names at one time, the system reduces the amount of time required to check the availability of multiple domain names. The set of names submitted by the user is sent to the query server for querying the registry database. In one embodiment, the user submits the set of names by typing individual names into text fields. In another embodiment, the user submits the set of names using a text window. In yet another embodiment, the user may check the availability of large sets of names using a batch mode implementation. This embodiment allows the user to work with a large number of names in a more efficient manner.

The query server searches the registry database for each name in the set of names. In one embodiment, each name is queried in combination with multiple TLD extensions without requiring the user to specify any TLD extensions with the set of names submitted. In another embodiment, the user may specify TLD extensions to be used when querying the registry database. The query server may automatically supplement the TLD extensions specified by the user with "related" TLD extensions; for example, if the user submits "abc.com," the query server may automatically check the availability of both "abc.com" and "abc.net." After the registry database has been queried for each of the names submitted, the user is presented with an Availability Results Table showing the availability of each name in conjunction with each TLD extension.

In one embodiment, the Availability Results Table also includes a selection mechanism, such as a check box, associated with each available domain name (name-TLD pair) whereby the user may select one or more domain names for registration. After selecting one or more domain names for registration and confirming the domain names selected, the user can submit a request for domain name registration that includes all available domain names selected from the Availability Results Table. After the query server registers the domain names selected, the user is presented with a Registry Response Table indicating which domain names were successfully registered. In another embodiment, the Registry Response Table also indicates the expiration date for each new domain name.

The multiple checking and registration method according to a preferred embodiment increases the speed and productivity with which domain names can be checked and registered by: a) providing a single screen, such as a web page, wherein the user can specify multiple domain names (with or without specifying TLD extensions) to be checked for availability; b) reporting the availability status for the multiple domain names at one time in the form of a results table that is easily analyzed; c) providing the ability to select, from the results table, multiple domain names to be submitted to the registry database for registration; and d) providing a response table indicating, for each selected domain name, whether registration was successful. This makes the task of selecting and registering a domain name easier than conventional methods.

Another embodiment of the invention includes a Smart-Check module to generate and suggest variations on an "ideal" domain name specified by a user. This functionality assists users in finding a suitable name from the names available for domain name registration. In one embodiment, the Smart-Check module uses a database of written and spoken language phrases and words along with statistical analysis and databases that contain information about the frequency of use of words and phrases in written and broadcast media to generate the suggested name variations.

BRIEF DESCRIPTION OF THE DRAWINGS

These and other features of the invention will now be described with reference to the drawings summarized below. These drawings and the associated description are provided to illustrate a preferred embodiment of the invention, and not to limit the scope of the invention.

FIG. 3 illustrates a Check Availability web page.

FIG. 4 illustrates a Check Availability web page according to another embodiment of the invention.

FIG. 6 illustrates a web page showing an Availability Results Table.

FIG. 7 illustrates an Availability Results Table according to another embodiment of the invention.

FIG. 8 illustrates a submission web page allowing the user to select multiple names for domain name registration.

FIG. 9 illustrates a summary screen web page.

FIG. 10 illustrates a web page showing a Registry Response Table.

DETAILED DESCRIPTION OF THE PREFERRED EMBODIMENT

The present invention provides a method for the entry, display and submittal of multiple names to a domain name registry database. Briefly, the method involves querying the registry database for multiple names submitted by a user and displaying the availability information for each of the multiple names in an Availability Results Table. The names may be submitted by the user either with or without TLD extensions. The user may then select one or more of the available names for registration as a domain name.

The invention can be implemented in a variety of embodiments. In one embodiment, the user submits multiple names to be checked for availability using a web-based form. In another embodiment, the user employs a batch mode application to submit large sets of names to be checked for availability. Although the invention will be described in relation to a domain name registry database, the method may be implemented for any of a variety of different types of text databases.

In one embodiment, a Smart-Check module is included to assist users in finding a suitable alternative to the originally desired or "ideal name" which may already be in use as a domain name. Given the ideal name, the Smart-Check module provides a number of alternatives that are variations on the ideal name. These alternatives may include similar sounding words to the ideal name, and/or words with a similar meaning as the ideal name.

For purposes of illustration, the method is described herein in the context of a web-based system. Throughout the description, reference will be made to various implementation-specific details of the web-based implementation. These details are provided in order to fully illustrate an embodiment of the invention, and not to limit the scope of the invention. The scope of the invention is set forth in the appended claims. The various process steps described herein are preferably performed by or using software executed by one or more general-purpose computers, although the process steps could alternatively be embodied in-whole or in-part within special purpose hardware.

I. Availability Checking Method and Display of Availability Results Table

Figure 1:
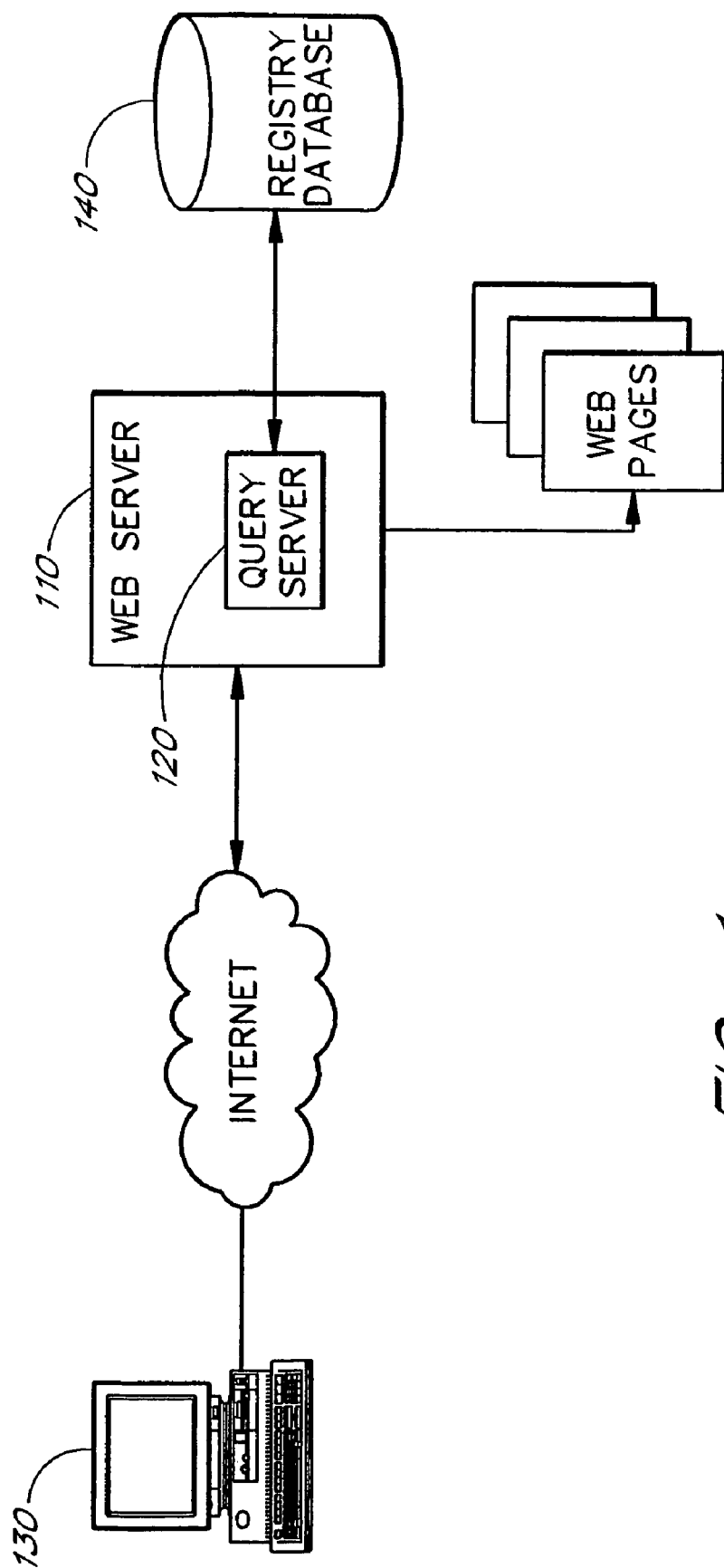
FIG. 1 illustrates a web server and a query server system according to one embodiment of the invention.

FIG. 1 illustrates a web server 110 and a query server 120 used to implement one embodiment of the present invention. From a user computer 130, a user submits multiple names (also referred to as a set of names) to determine which, if any, of the names are available to be registered as domain names in the registry database 140. The web server 110 receives the set of names over the Internet from the user computer 130 and sends the set of names to the query server 120. The query server 120 searches the registry database 140 to determine whether each of the names in the set of names is available for domain name registration. After determining the availability of each of the names in the set of names, the query server 120 returns the query results, and the web server 110 displays an Availability Results Table listing the availability status for each of the names in the set of names queried.

Figure 2:
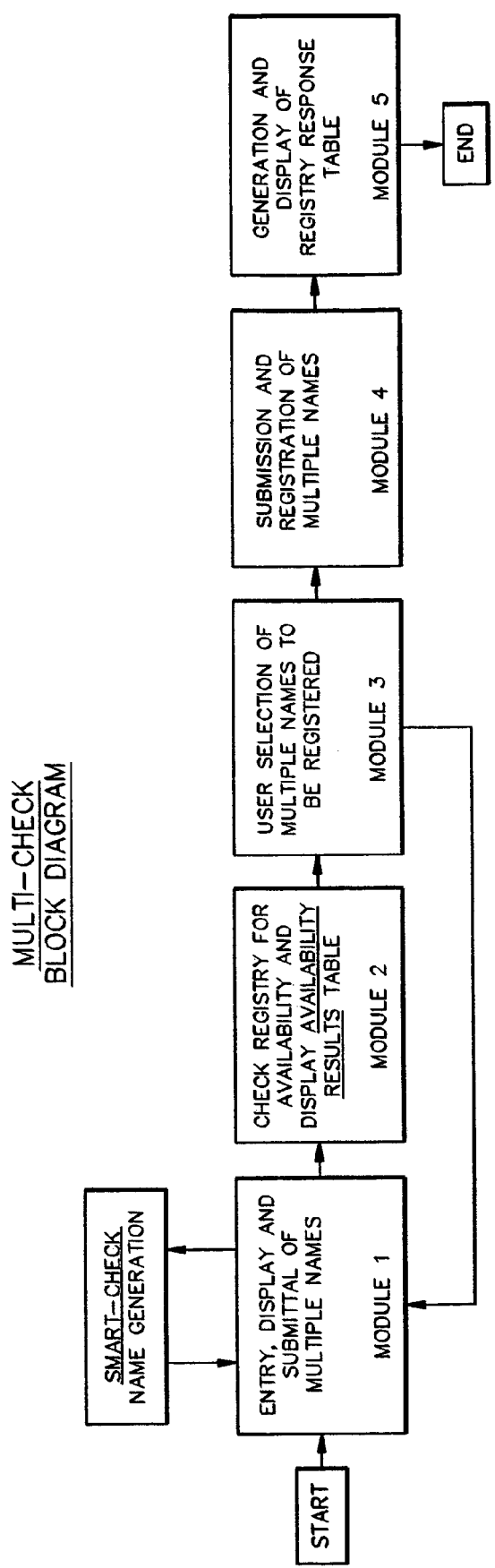
FIG. 2 illustrates a block diagram of the steps performed to check the availability of and select multiple names for domain name registration.

FIG. 2, which is a block diagram, provides a broad overview of one embodiment of the invention. In Module 1 of FIG. 2, the user is allowed to specify multiple names to be checked for availability in the registry database 140. In Module 2 of FIG. 2, the query server 120 checks the registry database 140 to determine the availability of each name in the set of names. The user is then presented with a table of results indicating which names from the set of names are available for domain name registration. This table will be referred to for convenience as the Availability Results Table. In addition to indicating which names in the set of names are available for domain name registration, the Availability Results Table may also include other relevant data, such as the expiration date of currently registered domain names (not shown).

In Module 3 of FIG. 2, the user is allowed to select multiple domain names (name-TLD pairs) from the Availability Results Table to be registered. By allowing the user to select and submit multiple domain names from the Availability Results Table, the system eliminates the need for the user to submit each domain name separately for registration. As indicated by Module 4 of FIG. 2, multiple domain names can then be submitted and registered in the registry database 140. In one embodiment, the multiple domain names registered at a given time can be registered with the specification of from one to the maximum number of name servers permitted. Currently, the maximum number of name servers that the registry database permits to be specified at the time of a domain name registration is thirteen. Finally, as depicted by Module 5 of FIG. 2, the user is presented with a real-time report indicating, for each submitted domain name, whether registration was successful. This table will be referred to for convenience only as the real-time Registry Response Table.

A web page 310 for one web-based embodiment is shown in FIG. 3. The user can specify multiple names to be checked for availability in the registry database 140 by typing or otherwise entering the names into the name fields 320. The web page 310 allows the user to clearly see all the names and variations typed into the name fields 320. In one embodiment (not shown) the user may specify the TLD extensions to be queried in conjunction with each name. In another embodiment (represented by FIG. 3 and subsequent figures) the query server 120 will automatically query each of the multiple names in conjunction with a predefined or dynamically selected set of TLD extensions, such as "com," "net," and "org." The set of TLD extensions can be varied to include any subset of the known TLD extensions, including two element extensions (such as .uk, .tv, or .cc) and three element extensions (such as .com, .net, or .org). For example, assuming the set of TLD extensions used in a given embodiment included "com," "net," and "org," if the user types "PetesGrill" into one of the name fields 320, the query server 120 would then search for "PetesGrill.com," "PetesGrill.net," and "PetesGrill.org." In one embodiment, characters not permitted by the registry database 140 for use in domain names (such as spaces) are deleted from the names specified by the user. For example, if a user specified a name containing a space in the name, such as "Petes Grill," the system would remove or ignore the space and check the name "PetesGrill" for domain name registration availability.

FIG. 4 illustrates a second web page 410 used in another web-based embodiment. In this embodiment, the user types or otherwise enters the names to be checked for availability into a text window 420. The user may also cut and paste the names from another text application into the text window 420. This web-based embodiment also deletes invalid characters (such as spaces) from the names specified. The query server 120 will automatically query each of the multiple names in conjunction with a set of various TLD extensions, such as "com," "net," and "org." The set of TLD extensions can be varied to include any subset of the known TLD extensions, including two element extensions (such as .uk, .tv, or .cc), three element extensions (such as .com, .net, or .org), and other multi-element extensions that may be placed into use in the future (such as .biz, .name, etc.). In another embodiment (not shown) the user may specify the TLD extensions to be queried in conjunction with each name. Additionally, in another embodiment (not shown) the query server 120 may select additional TLD extensions based on the type of at least one TLD extension specified by the user. For example, if the user specifies the ".com" extension, the query server 120 may also automatically check the ".net" extension.

Because the system is preferably implemented using an object-oriented extensible programming model (such as Java), it is possible for a virtually unlimited number of specified or system-generated names to be processed for availability analysis, reporting, selection, domain name registration, and registration confirmation at one time. In one web-based embodiment, the Availability Results and Registry Response Tables are dynamically created as Java Server Pages (JSPs).

Figure 5:
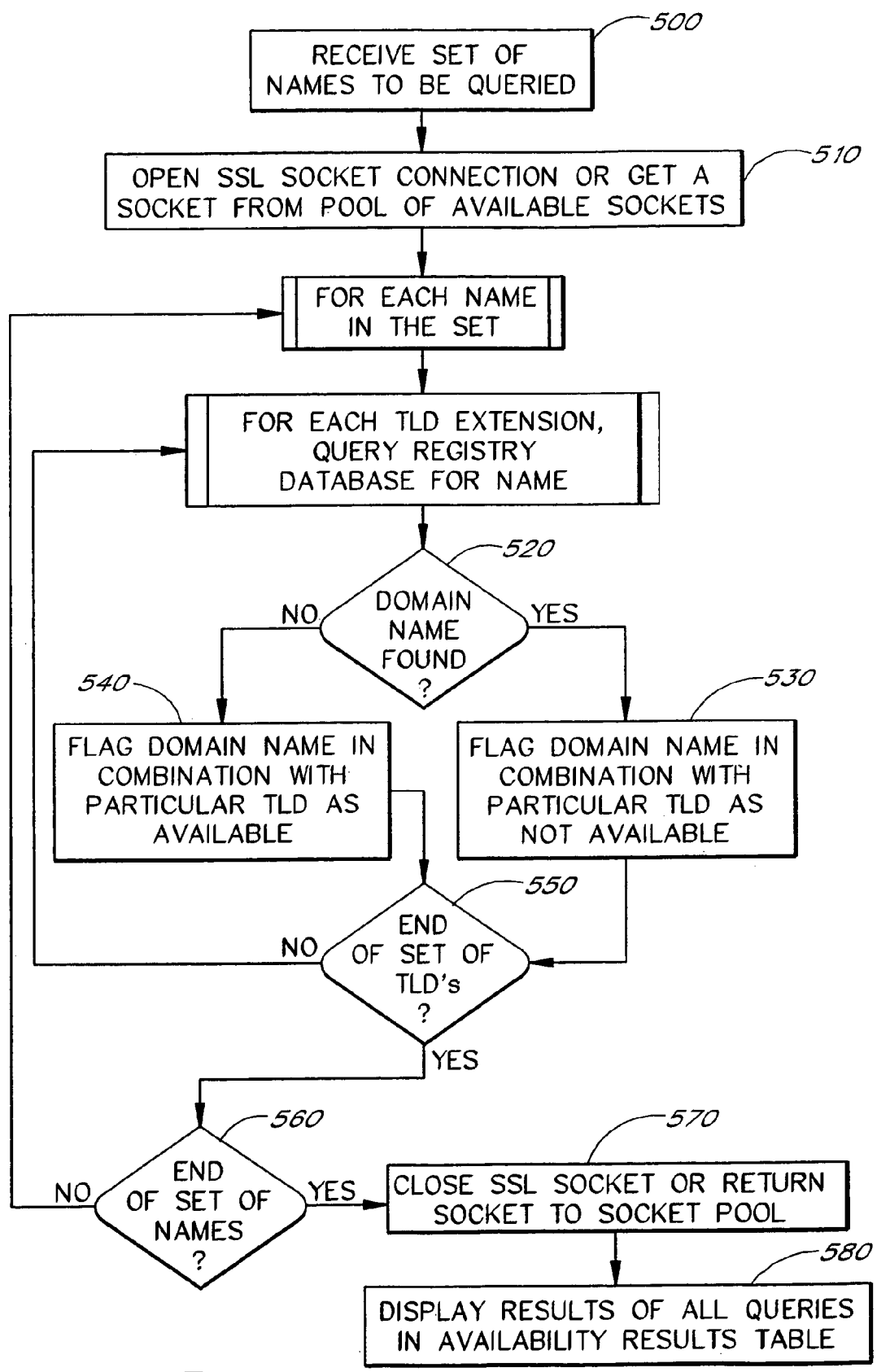
FIG. 5 illustrates the steps performed by the query server to process a query submission.

The query process will now be described in further detail with reference to FIG. 5, which is a flow diagram of the steps performed in querying the registry database 140 and displaying the Availability Results Table 580. In step 500, the query server 120 receives a set of names to be queried for availability in the registry database 140. After opening a Secure Socket Layer (SSL) socket (step 510) or alternatively by getting a socket from a pool of available sockets, the query server 120 checks the first name from the set of names in combination with the first of multiple TLD extensions such as "com," "net," and "org" (step 520). If the name is found in the registry database 140, it is flagged in step 530 as not available for domain name registration. Otherwise, it is flagged at step 540 as being available for domain name registration. After the first name has been queried with each of the multiple TLD extensions (step 550) the above steps are repeated with the second name in the set of names (step 560). Once each name in the set of names has been queried with each of the multiple TLD extensions, the SSL socket is closed or returned to the socket pool (step 570) and the query results for the set of names are displayed in an Availability Results Table (step 580).

To illustrate this process, it will be assumed that the user is searching for a domain name for a new restaurant and wants some variation of "Petes" with "grill" (or another suitable name such as "cafe," "diner," "place," or "restaurant"). Thus, the user types the query "PetesGrill" into one of the name fields 320 or into the text window 420. The user can also check other combinations by typing "PetesDiner," "PetesPlace," "PetesCafe," and "PetesRestaurant" into the name fields 320 or text window 420 (see FIG. 3 and FIG. 4).

As indicated by step 510, the query server 120 opens a SSL socket to the registry database 140 or alternatively gets a socket from a pool of available sockets. In step 520, queries are run using the name "PetesGrill" (the first name in the set of names) in combination with multiple TLD extensions such as "com," "net," and "org." Thus, for example, the query server 120 first looks for "PetesGrill.com" in the registry database 140. If, at step 520, "PetesGrill.com" is found in the registry database 140, "PetesGrill.com" is flagged at step 530 as not available for domain name registration. Otherwise, "PetesGrill.com" is flagged at step 540 as being available for domain name registration. These steps are repeated for "PetesGrill.net" and "PetesGrill.org." After "PetesGrill" has been queried with each of the multiple TLD extensions, the query server 120 will query the registry database for "PetesDiner" (the second name in the set of names) in combination with the multiple TLD extensions. The above process is then repeated for "PetesPlace," "PetesCafe," and "PetesRestaurant." After each of the names has been queried with each of the multiple TLD extensions, the SSL socket is closed or returned to the socket pool (step 570) and the query results for the set of names is displayed in an Availability Results Table (step 580).

FIG. 6 illustrates an Availability Results Table 620 shown in a web-based embodiment 610. The Availability Results Table 620 allows the user to immediately see which names are in use by others and which names are available to be registered in the registry database 140. In one embodiment, a hypertext link (not shown) to additional information is provided for each name-TLD pair listed as not available for domain name registration. The user can select the link to find out information concerning the registered domain name, such as registrant name, contact information, and/or domain name expiration date. The hypertext link may, for example, include a text message such as "Not Available." Additionally, the Availability Results Table 620 provides check boxes 630 or another selection mechanism for each available domain name, whereby the user can select multiple domain names for registration in the registry database 140. Pull-down fields, radio buttons and other types of display elements may alternatively be used for this purpose. The Availability Results Table 620A for another embodiment is shown in FIG. 7.

II. Registration and Display of Registry Response Table

As illustrated in FIG. 8, the user is allowed to select multiple names to be submitted for domain name registration at one time. After selecting one or more names desired for domain name registration and submitting such names (e.g., by selecting a "Register Selected Names" button) the user is provided with a summary screen, as shown in FIG. 9, listing the names to be registered in the registry database 140. The user may remove or add names to the summary list before submitting the names for registration. The summary screen may alternatively be omitted, in which case the selected domain name(s) may be registered directly from the Availability Results Table page. The registrant name and contact information supplied to the registry database 140 may be supplied by the user either beforehand (e.g., while setting up an account with an operator of the query server) or during the registration process. Once the set of domain names to be registered has been submitted, the query server 120 adds the domain names and related information to the registry database 140.

After registration of each of the domain names has been completed in the registry database 140, the real-time Registry Response Table 1020, as illustrated in FIG. 10, is presented to the user to indicate the results of the registration submission to the registry database 140. The real-time Registry Response Table 1020 eliminates the uncertainty that had been present for the initial forty-eight hours following a domain name registration. During this initial period, users were not completely sure whether the name they had requested to be registered had in fact been registered for them. The real-time Registry Response Table 1020 indicates immediately for each of the one or more domain names submitted for registration whether the registration has been properly accepted by the registry database 140 and is in an "active" status. The table also indicates for each domain name the date of expiration of the registration as reported by the registry database 140.

As apparent in the foregoing description of a preferred embodiment, the user can check the availability of multiple domain names, submit one or more domain names for registration, and determine the results of the registration submission without needing to load or view more than four web pages (or three web pages if the summary page is omitted). By reducing the number of web page loads, the system significantly increases the efficiency of the registration process.

III. Smart-Check Module

The query server 120 may optionally include a Smart-Check module for automatically checking names that are similar or related to those specified by the user. In one embodiment, the Smart-Check module uses a database of written and spoken language phrases and words, along with statistical analysis and databases that contain information about the frequency of use of words and phrases in written and broadcast media, to generate variations of a user-specified ideal domain name. The module may be provided as an optional feature that can be enabled and disabled by the user (e.g., using a check box provided on the "Check Availability" page).

The Smart-Check module preferably suggests alternatives and variations based on frequency of use in a specified language and therefore generates familiar or recognizable names. Additionally, the Smart-Check module can generate names that do not exist in the lexicon, but have strong connections to existing words or phrases in the specified language. The generation of alternative names is preferably accomplished using databases containing frequency of use information about words and phrases in a particular language, databases containing information about idiomatic expressions commonly used in the specified language, and databases of company names and their associated business activities. Using these databases as tools and well-known artificial intelligence algorithms including neural network algorithms, the Smart-Check module generates variations on the ideal name or names originally specified by the user.

In one embodiment, the Smart-Check module may be directed to generate variations based on the ideal name by taking into account user-specified qualities that are sought in the name desired. For example, such qualities may include humorous qualities, cynical/satirical qualities, qualities that reflect a company's business activities or goals, or emotional states (such as happiness, sadness or enthusiasm). The Smart-Check module can also take into account whether the variation has a double meaning or relates to a term of art in a particular field of endeavor.

In another embodiment, the Smart-Check module checks various combinations and permutations of user specified names. For example, a user wanting a domain name derived from some variation of his own personal name can use the Smart-Check module to check for various combinations and permutations of his first, middle and last names. Thus, if the user enters his name of "John Paul Doe," the Smart-Check module checks the availability of combinations and permutations of "John," "Paul," and "Doe" (such as "JohnDoe," "JDoe," "JPDoe," "JohnPDoe," "JohnD," etc.).

The additional names, if any, added to the set by the Smart-Check module may be checked for availability using the same process as described above. The results for these additional names may, for example, be shown in a separate Availability Results Table on the same web page, or in the same Availability Results Table (e.g., in a different color) as the user-specified names. Further, the web page displaying the Availability Results Table could include a separate Availability Results Table for each user-specified name, such that the results for the names added by Smart-Check are shown in the respective tables to which they correspond.

Although this invention has been described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A computer-implemented method, comprising:
   receiving a request generated by a user via submission of a first electronic form;
   checking availability statuses of a plurality of items that correspond to the request; and
   outputting results of the request to the user via a second electronic form that includes a tabular display having a plurality of rows and a plurality of columns, wherein each of the plurality of items corresponds to a respective intersection of a row and a column, and the tabular display indicates, at the intersections of the rows and columns, the availability statuses of corresponding ones of said items;
   wherein the items are domain names, and the tabular display indicates registration availability statuses of the domain names.

2. The method of claim 1, wherein the second electronic form includes functionality for the user to select multiple items from the tabular display, and to submit a single request that specifies multiple selected items.

3. The method of claim 1, wherein the second electronic form includes check boxes at respective intersections of the rows and columns, said check boxes permitting multiple ones of said items to be selected concurrently for purposes of submitting the second electronic form.

4. The method of claim 1, wherein each row of the tabular display corresponds to a respective name, and each column corresponds to a respective Top Level Domain extension.

5. The method of claim 1, further comprising receiving a subsequent request generated via submission of the second electronic form, said subsequent request identifying multiple items selected by the user via the tabular display.

6. The method of claim 1, wherein the second electronic form provides functionality for generating a registration request that identifies multiple domain names selected from the tabular display.

7. The method of claim 1, wherein the method is performed by a server system that communicates over a network with a user computer.

8. A server system programmed to perform the method of claim 1.

9. A domain name registration system, comprising:
   a first electronic form adapted for user generation of requests to check availability statuses of domain names; and
   a server system programmed to respond to a request generated by a user via the first electronic form by at least (a) determining registration availability statuses of a plurality of domain names, each domain name including a name and top level domain (TLD) extension, and (b) generating a second electronic form to present to the user, said second electronic form comprising a tabular display having a plurality of rows and a plurality of columns, and indicating, at intersections of said rows and columns, the registration availability statuses of the corresponding domain names;
   wherein the second electronic form is configured to enable the user to select multiple available domain names to register, and to generate a single request that specifies multiple available domain names selected to register.

10. The domain name registration system of claim 9, wherein the first electronic form includes multiple name fields that are adapted to be populated with respective names to be checked.

11. The domain name registration system of claim 9, wherein the server system is programmed to automatically generate an alternative name using a name supplied by a user, and to check availability statuses of domain names that include the alternative name.

12. The domain name registration system of claim 9, wherein each of the rows corresponds to a different respective name.

13. The domain name registration system of claim 9, wherein the tabular display includes means for selecting each available domain name.

14. A method of facilitating registration of domain names, comprising:
   receiving, via a computer network, a search request specified by a user;
   responding to the search request, at least in part, by (a) programmatically checking a registration availability of each of a plurality of names in combination with each of a plurality of Top Level Domain (TLD) extensions, and (b) generating, and transmitting via the computer network for presentation to the user, a web form comprising a result table having a plurality of rows and a plurality of columns, wherein the result table indicates, at intersections of the rows and columns, the registration availabilities of corresponding combinations of said names and TLD extensions, and wherein the web form is configured to enable each available combination of a name with a TLD extension to be selected via the table to register; and
   receiving, via the computer network, as a result of a single submission of the web form by the user, an identification of a plurality of said combinations selected by the user via said table to register.

15. The method of claim 14, wherein the plurality of names consists of names specified by the user via the search request.

16. The method of claim 14, wherein the plurality of names includes at least one auto-generated name not specified by the user.

17. The method of claim 14, wherein the method further comprises programmatically generating at least one of the names based on one or more names specified by the user via the search request.

18. The method of claim 17, wherein programmatically generating at least one of the names comprises combining multiple names specified by the user in multiple different ways to generate multiple alternative names to suggest to the user.

19. A domain name registration system programmed to perform the method of claim 14.

* * * * *